United States Patent
Greiner et al.

(10) Patent No.: US 10,169,239 B2
(45) Date of Patent: Jan. 1, 2019

(54) MANAGING A PREFETCH QUEUE BASED ON PRIORITY INDICATIONS OF PREFETCH REQUESTS

(71) Applicant: INTERNATIONAL BUSINESS MACHINES CORPORATION, Armonk, NY (US)

(72) Inventors: Dan F. Greiner, San Jose, CA (US); Michael K. Gschwind, Chappaqua, NY (US); Christian Jacobi, Poughkeepsie, NY (US); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 15/214,549

(22) Filed: Jul. 20, 2016

(65) Prior Publication Data
US 2018/0024929 A1 Jan. 25, 2018

(51) Int. Cl.
*G06F 12/00* (2006.01)
*G06F 13/00* (2006.01)
(Continued)

(52) U.S. Cl.
CPC ...... *G06F 12/0862* (2013.01); *G06F 12/0875* (2013.01); *G06F 2212/1016* (2013.01); *G06F 2212/602* (2013.01); *G06F 2212/6028* (2013.01)

(58) Field of Classification Search
CPC ............. G06F 12/0862; G06F 12/0875; G06F 2212/1016; G06F 2212/602; G06F 2212/6028
(Continued)

(56) References Cited

U.S. PATENT DOCUMENTS

| 5,392,443 A * | 2/1995 | Sakakibara ......... G06F 12/0607 |
| | | 708/520 |
| 5,758,119 A | 5/1998 | Mayfield et al. |

(Continued)

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Sheng Jen Tsai
(74) *Attorney, Agent, or Firm* — Steven Chiu, Esq.; Blanche E. Schiller, Esq.; Heslin Rothenberg Farley & Mesiti P.C.

(57) ABSTRACT

A prefetch request having a priority assigned thereto is obtained, based on executing a prefetch instruction included within a program. Based on obtaining the prefetch request, a determination is made as to whether the prefetch request may be placed on a prefetch queue. This determination includes determining whether the prefetch queue is full; checking, based on determining the prefetch queue is full, whether the priority of the prefetch request is considered a high priority; determining, based on the checking indicating the priority of the prefetch request is considered a high priority, whether another prefetch request on the prefetch queue may be removed; removing the other prefetch request from the prefetch queue, based on determining the other prefetch request may be removed; and adding the prefetch request to the prefetch queue, based on removing the other prefetch request.

20 Claims, 5 Drawing Sheets

(51) Int. Cl.
*G06F 13/28* (2006.01)
*G06F 12/0862* (2016.01)
*G06F 12/0875* (2016.01)

(58) Field of Classification Search
USPC .................................................. 711/137
See application file for complete search history.

(56) References Cited

U.S. PATENT DOCUMENTS

| | | | |
|---|---|---|---|
| 5,802,569 A * | 9/1998 | Genduso | G06F 9/3802 |
| | | | 711/137 |
| 5,835,967 A * | 11/1998 | McMahan | G06F 9/3802 |
| | | | 711/213 |
| 5,948,081 A * | 9/1999 | Foster | G06F 13/1642 |
| | | | 710/25 |
| 6,055,621 A | 4/2000 | Puzak | |
| 6,560,693 B1 | 5/2003 | Puzak et al. | |
| 6,574,713 B1 | 6/2003 | Kosche | |
| 6,662,273 B1 | 12/2003 | Wilkerson | |
| 7,222,217 B2 | 5/2007 | Gray | |
| 7,350,030 B2 * | 3/2008 | Rotithor | G06F 12/0862 |
| | | | 711/100 |
| 7,386,683 B2 | 6/2008 | Blumrich et al. | |
| 7,506,105 B2 | 3/2009 | Al-Sukhni et al. | |
| 7,840,761 B2 * | 11/2010 | Colavin | G06F 9/383 |
| | | | 711/137 |
| 7,958,316 B2 * | 6/2011 | Speight | G06F 12/0862 |
| | | | 711/137 |
| 7,958,317 B2 | 6/2011 | Speight et al. | |
| 8,135,642 B1 | 3/2012 | Krause | |
| 8,255,631 B2 | 8/2012 | Chen et al. | |
| 8,266,344 B1 * | 9/2012 | Lampert | H04L 49/252 |
| | | | 710/13 |
| 8,707,014 B2 | 4/2014 | Yamazaki | |
| 8,812,822 B2 | 8/2014 | Luick | |
| 9,081,501 B2 | 7/2015 | Asaad et al. | |
| 2002/0087802 A1 | 7/2002 | Al-Dajani | |
| 2002/0099913 A1 | 7/2002 | Steely, Jr. | |
| 2002/0144054 A1 | 10/2002 | Fanning | |
| 2003/0005419 A1 | 1/2003 | Pieper | |
| 2004/0049640 A1 * | 3/2004 | So | G06F 12/0862 |
| | | | 711/137 |
| 2005/0175027 A1 * | 8/2005 | Miller | H04L 47/15 |
| | | | 370/458 |
| 2006/0136228 A1 | 6/2006 | Lin | |
| 2006/0143401 A1 * | 6/2006 | Doweck | G06F 12/0862 |
| | | | 711/137 |
| 2006/0274750 A1 | 12/2006 | Babbar | |
| 2008/0091921 A1 | 4/2008 | Abuaiadh et al. | |
| 2009/0199190 A1 * | 8/2009 | Chen | G06F 9/383 |
| | | | 718/102 |
| 2010/0010965 A1 | 1/2010 | Edlund et al. | |
| 2011/0307455 A1 | 12/2011 | Gupta | |
| 2012/0226892 A1 | 9/2012 | Tirumalai et al. | |
| 2013/0151784 A1 | 6/2013 | Bell | |
| 2013/0159630 A1 | 6/2013 | Lichmanov | |
| 2013/0282987 A1 | 10/2013 | Koob | |
| 2013/0332705 A1 | 12/2013 | Martinez | |
| 2013/0346694 A1 | 12/2013 | Krick | |
| 2014/0115245 A1 | 4/2014 | Maybee et al. | |
| 2014/0129773 A1 | 5/2014 | Habermann et al. | |
| 2014/0156932 A1 | 6/2014 | Dundas | |
| 2014/0281248 A1 | 9/2014 | Alameldeen | |
| 2015/0058308 A1 | 2/2015 | Zheng | |
| 2015/9958308 | 2/2015 | Zheng | |
| 2015/0089139 A1 | 3/2015 | Zaks | |
| 2015/0095577 A1 | 4/2015 | Vijayrao et al. | |
| 2015/0142762 A1 | 5/2015 | Konik et al. | |
| 2015/0161065 A1 * | 6/2015 | Lunadier | G06F 13/364 |
| | | | 710/110 |
| 2015/0309944 A1 | 10/2015 | Sadoughi-Yarandi et al. | |
| 2015/0378917 A1 | 12/2015 | Busaba et al. | |
| 2015/0378918 A1 | 12/2015 | Busaba | |
| 2016/0026580 A1 | 1/2016 | Dooley et al. | |
| 2016/0314069 A1 | 10/2016 | Luttrell | |
| 2017/0024165 A1 | 1/2017 | Kazama | |
| 2017/0046202 A1 | 2/2017 | Bao | |
| 2017/0123979 A1 | 5/2017 | V | |
| 2017/0132124 A1 * | 5/2017 | Gschwind | G06F 12/0215 |
| 2017/0132133 A1 * | 5/2017 | Gschwind | G06F 12/0862 |
| 2017/0132134 A1 * | 5/2017 | Gschwind | G06F 12/0862 |
| 2017/0132135 A1 * | 5/2017 | Gschwind | G06F 12/0862 |
| 2017/0132147 A1 | 5/2017 | Loh | |
| 2018/0024836 A1 | 1/2018 | Greiner et al. | |
| 2018/0024930 A1 | 1/2018 | Greiner et al. | |
| 2018/0024933 A1 | 1/2018 | Greiner et al. | |
| 2018/0060241 A1 | 3/2018 | Greiner et al. | |

OTHER PUBLICATIONS

IBM, "z/Architecture—Principles of Operation," SA22-7832-10, Eleventh Edition, Mar. 20, 2015, pp. 1-1732.

IBM, "Power ISA—V2.07B," Apr. 9, 2015, pp. 1-1527.

Chen, Yong et al., "Global-aware and multi-order context-based prefetching for high-performance processors," The International Journal of High Performance Computing Applications, Mar. 31, 2016, pp. 1-16.

Anonymous, "Prefetching Mechanism with Cache-Aware Optimized Control," IPCOM000211215D, Sep. 27, 2011, p. 1 (+ cover).

Ailamaki, Anastassia et al., "DBMSs on a Modern Processor: Where Does Time Go?," Proceedings of the 25th VLDB Conference, Edinburgh, Scotland, Sep. 1999, pp. 266-277.

Anonymous, "Method for Priority-Based Cache-Line Residency," IPCOM000128946, Sep. 2005, pp. 1-3 (+ cover).

Song, SP, "Methods of Specifying Data Prefetching Without Using a Separate Instruction," IPCOM000115743, Jun. 1, 1995, pp. 355-356 (+ cover).

Arnold, Ronny L., et al., "A Method for Qualifying Instruction Line Prefetch With A Line-Wrapped Cache," May 1996, pp. 161-163 (+ cover).

Johnson, Teresa L. et al., "Run-time Spatial Locality Detection and Optimization," Proceeding of the 30th Annual ACM/IEEE International Symposium on MicroArchitecture, Dec. 1997, pp. 57-64.

Liu, L., "Utilization-Based Prefetching," IPCOM000063165D, Feb. 1985, pp. 1-2 (+ cover).

Bennett, B.T., et al., "Prefetching in a Multilevel Memory Hierarchy," IPCOM000049471D, pp. 1-2 (+ cover).

Greiner, Dan F., et al., "Instruction to Query Cache Residency," U.S. Appl. No. 15/214,577, filed Jul. 20, 2016, pp. 1-41.

Gschwind, Michael K., et al., "Processing Data Based on Cache Residency," U.S. Appl. No. 15/214,597, filed Jul. 20, 2016, pp. 1-42.

Gschwind, Michael K., et al., "Determining the Effectiveness of Prefetch Instructions," U.S. Appl. No. 15/214,624, filed Jul. 20, 2016, pp. 1-37.

List of IBM Patents or Patent Applications Treated as Related, Jan. 30, 2017, pp. 1-2.

Greiner, Dan F., "Instruction to Query Cache Residency", U.S. Appl. No. 15/804,574, filed Nov. 6, 2017, pp. 1-37.

List of IBM Patents or Patent Applications Treated as Related, Jan. 2, 2018, pp. 1-2.

* cited by examiner

MANAGING A PREFETCH QUEUE BASED ON PRIORITY INDICATIONS OF PREFETCH REQUESTS

BACKGROUND

One or more aspects relate, in general, to processing within a computing environment, and in particular, to processing associated with prefetch requests.

Managed Runtime Environments (MRTEs), as well as other environments, may employ a garbage collection (GC) function to remove memory objects from a software heap that are no longer in use. This function typically has to access a large section, or perhaps all, of the heap to determine if an object is no longer referenced by any other object. Since a great deal of memory is accessed, the garbage collection function typically exploits prefetch instructions.

Examples of prefetch instructions include the Prefetch Data (PFD) and Prefetch Data Relative Long (PFDRL) instructions, as defined in the z/Architecture offered by International Business Machines Corporation, Armonk, N.Y. The prefetch instructions instruct the central processing unit (CPU) to prefetch data of a cache line into a local data cache prior to the time that cache line is needed. Therefore, when the CPU actually needs data from the cache line for a subsequent load or store instruction, it is typically already in the cache, or at least on its way to being delivered from a higher level cache or main memory.

Often, there is such a high cache miss rate that the CPU cannot service all of the prefetch requests and still provide normal load and store data that is requested. Therefore, some CPUs employ a prefetch queue (PQ) to hold these prefetch requests. If a particular CPU implementation has no queue, it can effectively be thought of as having a prefetch queue size of one request. The prefetch queue is typically examined after there is a miss in the cache, and entries are only added to it after it is known that there is a cache miss and there is a need to go to a higher level cache, or main memory, to satisfy it. In other implementations, the prefetch queue may be merged with the queue that handles all cache misses for normal loads and stores.

In many cases, speculative software prefetch requests are issued. This typically occurs when it is not known if a future branch path will be taken, but there is a chance to prefetch anyway. These speculative prefetches often significantly increase the number of prefetch requests the CPU is to process. However, in many cases these speculative prefetches do not improve performance, if they are never actually needed, and can actually decrease overall performance due to wasted cache bandwidth.

SUMMARY

Shortcomings of the prior art are overcome and additional advantages are provided through the provision of a computer program product for managing prefetch queues. The computer program product includes a storage medium readable by a processing circuit and storing instructions for execution by the processing circuit for performing a method. The method includes, for instance, obtaining a prefetch request based on executing a prefetch instruction included within a program, the prefetch request having a priority assigned thereto; determining, based on obtaining the prefetch request, whether the prefetch request may be placed on a prefetch queue, the determining including: determining whether the prefetch queue is full; checking, based on determining the prefetch queue is full, whether the priority of the prefetch request is considered a high priority; determining, based on the checking indicating the priority of the prefetch request is considered a high priority, whether another prefetch request on the prefetch queue may be removed; removing the other prefetch request from the prefetch queue, based on determining the other prefetch request may be removed; and adding the prefetch request to the prefetch queue, based on removing the other prefetch request.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, priority indications are assigned to prefetch requests and may be used in processing the requests. In one example, the processing includes determining whether a prefetch request is to be added to a prefetch queue used to hold prefetch requests. The prefetch request is, for instance, a software prefetch request generated by program code based on a prefetch instruction issued by the program missing in a selected cache (e.g., an L1 cache or other level cache). The program generates the request, based on the cache miss, and assigns a priority thereto, as described in further detail below.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel 64 and IA-32 architectures. Other examples also exist.

Figure 1A:
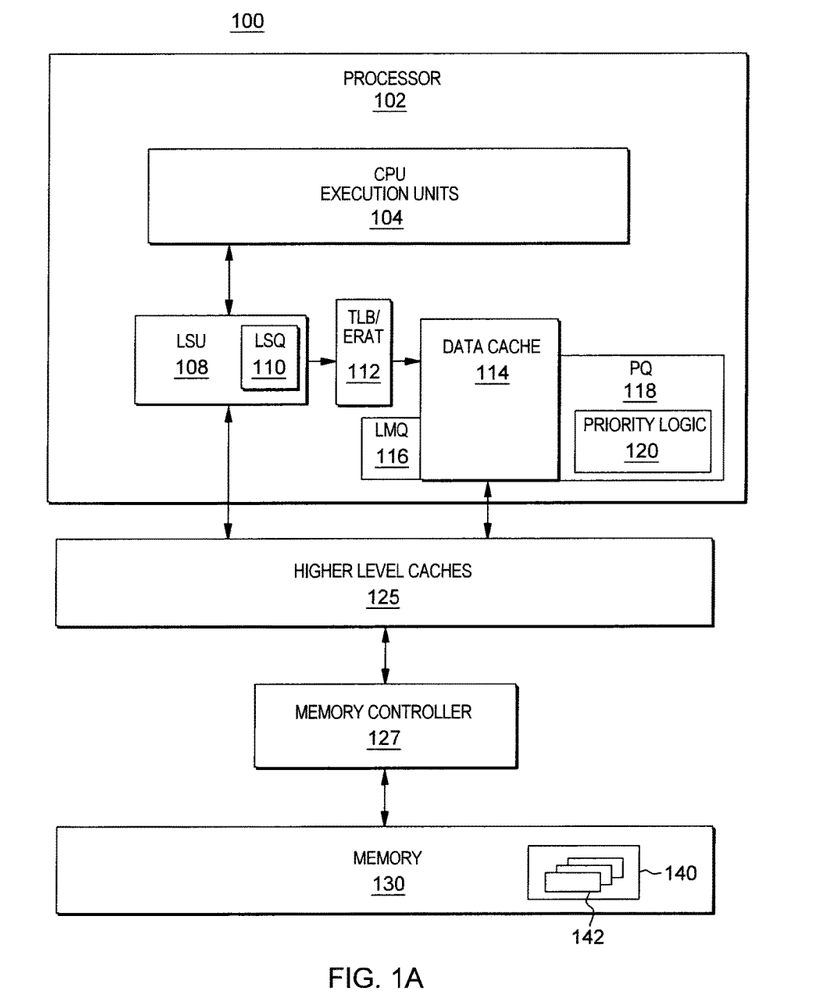
FIG. 1A depicts one example of a computing environment to incorporate and use one or more aspects of the present invention.

Referring to FIG. 1A, in one example, a computing environment 100 includes at least one central processing unit (CPU) 102 (a.k.a., a processor) coupled to one or more higher level caches 125. Central processing unit 102 includes, for instance, one or more execution units 104 to request and consume data. Execution units 104 are coupled to a load/store unit (LSU) 108, which includes a load/store queue (LSQ) 110. Load/store unit 108 issues memory access operations (loads and stores) that retrieve prefetched data or cause the data to be fetched from the memory subsystem or higher level caches. LSU 108 may be coupled to a data cache 114 via, e.g., a translation mechanism 112, indicated as, e.g., a translation lookaside buffer (TLB) or an effective to real address translation table (ERAT).

CPU 102 is coupled to and communicates with a memory hierarchy that includes, for instance, data cache 114, which is an L1 data cache; one or more higher level caches 125, which may include a single level two (L2) cache or multiple other sequentially numbered higher levels, e.g., L3, L4; a memory 130; and an associated memory controller 127, which controls accesses to memory 130. L1 data cache 114 serves as a prefetch buffer for data (and/or data streams) that are prefetched. L1 data cache 114 has a corresponding load miss queue (LMQ) 116, which the cache utilizes to save information about ongoing prefetch requests, and a prefetch queue (PQ) 118 to hold prefetch requests. In another embodiment, prefetch queue 118 may be integrated with load miss queue 116. Further, in one example, the prefetch queue includes priority logic 120 used in determining, when appropriate, whether prefetch requests are to be added to the prefetch queue.

Memory 130 may include at least one program product having a set (e.g., at least one) of program modules that are configured to carry out the functions of embodiments of the invention. Program/utility 140, having a set (at least one) of program modules 142, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 142 may generally carry out the functions and/or methodologies of embodiments of the invention described herein.

In addition to the example memory hierarchy, computing environment 100 may also include additional storage devices that form a part of the memory hierarchy from the perspective of CPU 102. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

The buses may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Video Electronics Standards Association (VESA) local bus, and Peripheral Component Interconnect (PCI) bus.

Figure 1B:
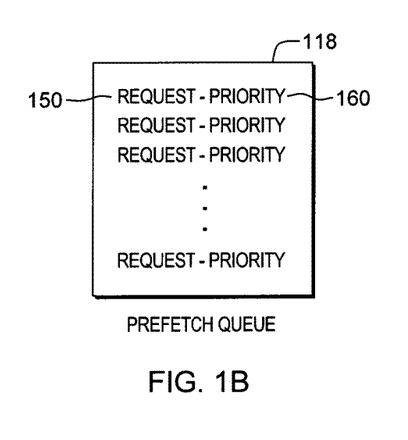
FIG. 1B depicts further details of a prefetch queue used in the computing environment of FIG. 1A, in accordance with an aspect of the present invention.

Further details regarding prefetch queue (PQ) 118 are described with reference to FIG. 1B. Prefetch queue 118 includes, in accordance with an aspect of the present invention, one or more prefetch requests 150, and each prefetch request 150 is assigned a priority 160. The priority may be a 2-state priority, such as high (e.g., 1) or low (e.g., 0), or it may have a more granular value, in which multiple states are used to define the priority. For example, a 4-state priority may be used, using 2 bits, that provides a priority scale. Other possibilities also exist.

In one example, the priority is assigned to a prefetch request by the program executing the prefetch instruction that missed in the cache resulting in the generation of the prefetch request, and may depend on how confident the software (e.g., the program issuing the prefetch instruction) is that the request will be used versus a speculative request. It may reflect the importance of the request to the overall system performance. Any metric may be used to determine the priority of one request over another request. Further, in those instances where there are more than two states: high, low, a specified number of the states (one or more) may be defined as a high priority, and another specified number of the states (one or more) may be defined as a low priority. Many possibilities exist.

Further, although in the example herein, the priority is shown in the prefetch queue, in other embodiments, the priority may be maintained elsewhere and the prefetch queue just includes the prefetch requests. Again, other variations are possible.

The priorities assigned to the prefetch requests are used, in accordance with an aspect of the present invention, to manage prefetch queue 118. One embodiment of the logic used to manage the prefetch queue based on the assigned priorities is described with reference to FIG. 2. This logic is performed by processor 102, in one example.

Figure 2:
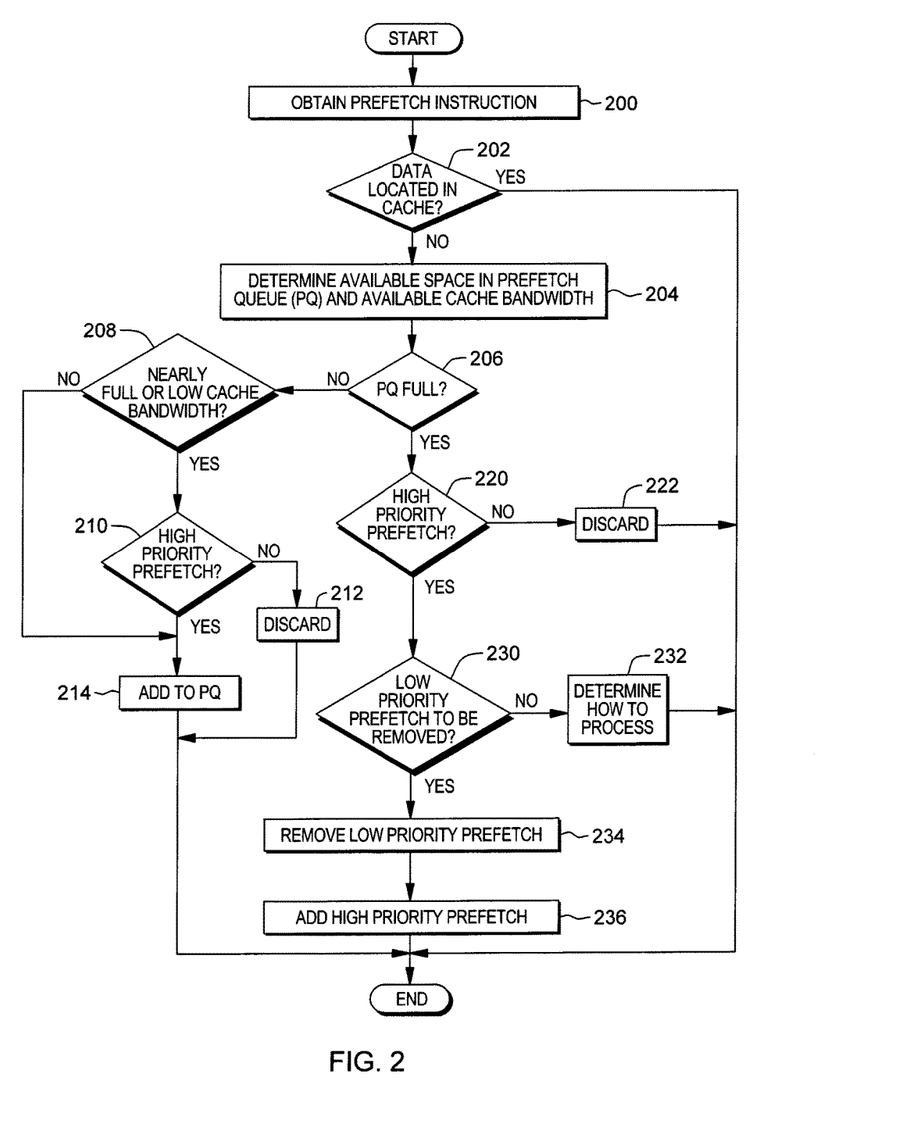
FIG. 2 depicts one example of logic to process prefetch requests based on priority indications, in accordance with an aspect of the present invention.

Referring to FIG. 2, initially, a prefetch instruction, included within a program, is obtained, STEP 200. For instance, if the processor is based on the z/Architecture, it may receive a Prefetch Data (PFD) instruction or a Prefetch Data Relative Long (PFDRL) instruction; or if it is based on the Intel architecture, it may receive a Prefetch (PREFETCHh) instruction. Other instructions for other architectures may also be received.

Based on receiving the prefetch instruction, a determination is made as to whether the data at the memory location designated by the operand of the prefetch instruction is located in the cache (e.g., L1 cache 114), INQUIRY 202. For instance, the address of the received prefetch instruction is queried in the cache to determine if the data already exists in the cache. If the data is in the cache, then processing is complete. Otherwise, there is a miss in the cache, and a prefetch request corresponding to the prefetch instruction that missed in the cache is attempted to be placed on the prefetch queue, as described below.

Should the data at the memory location designated by the prefetch instruction be missing from the cache, INQUIRY 202, then available space in the prefetch queue (PQ) and available cache bandwidth are determined, in one embodiment, STEP 204. Further, a determination is made as to whether the prefetch queue is full, INQUIRY 206. As used herein, full may indicate there is no available space to receive another request or another measure may be used to indicate it is full (e.g., can only receive X number of additional requests, where X is defined in the system). If the prefetch queue is not full, INQUIRY 206, then a further determination is made as to whether the prefetch queue is nearly full or there is a low cache bandwidth, INQUIRY 208. Again, nearly full may be indicated as being able to accept Y additional requests, where Y is one or more and is defined in the system. Similarly, a low cache bandwidth may be indicated by dynamic criteria based, for instance, on arrival rate of cache requests. For instance, assuming a cache bandwidth of X bytes per Y cycles, if the arrival rate of cache requests is greater than X/Y, then the bandwidth may be considered low in this example. Other criteria may also be used.

If the prefetch queue is not nearly full or the bandwidth is not low, INQUIRY 208, then a prefetch request is added to the prefetch queue, STEP 214. However, if the prefetch queue is nearly full or there is a low cache bandwidth, then a further determination is made as to whether the prefetch request has been assigned a high priority by, e.g., the program, INQUIRY 210. If it is not a high priority request, then the prefetch request is discarded, in this embodiment, STEP 212; otherwise, it is added to the prefetch queue, STEP 214.

Returning to INQUIRY 206, if the prefetch queue is full, then a determination is made as to whether the prefetch request is assigned a high priority, INQUIRY 220. If it is not a high priority request, then the prefetch request is discarded, STEP 222. However, if the prefetch request is a high priority request, then a further determination is made as to whether there is a low priority request on the prefetch queue that may be removed, INQUIRY 230. If there is not a low priority request that may be removed from the prefetch queue, then a determination is made as to how to process the current prefetch request, STEP 232. For instance, the incoming request may be dropped or further processing of the request may be deferred for a defined time, e.g., until space becomes available.

Returning to INQUIRY 230, if there is a low priority prefetch request that may be removed, then it is removed, STEP 234, and the current high priority instruction is added to the prefetch queue, STEP 236. This concludes processing.

In further embodiments, there may be levels associated with high requests and/or low requests, and/or a scaling between high and low requests, and therefore, the determination would be whether there is a request with a lower priority than the request attempting to be added to the queue. For instance, if the request being added has a high priority of level 1 and there is a request on the queue with a high priority of level 2, then the high priority level 2 request is considered the low priority request that may be removed from the queue. In yet a further embodiment, the test is for the lowest priority request on the queue, and it is the lowest priority request that is considered the low priority request and may be removed. Other possibilities also exist.

Figure 3A:
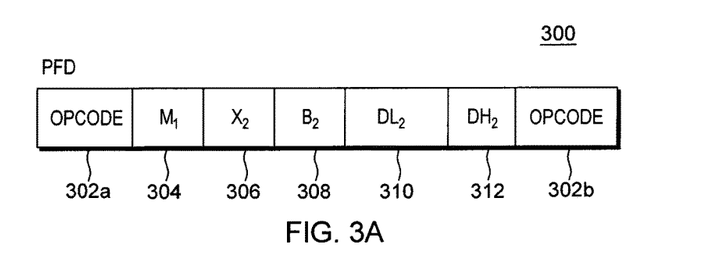
FIG. 3A depicts one example of a format of a Prefetch Data instruction, in accordance with an aspect of the present invention.

Further details regarding example prefetch instructions are described with reference to FIGS. 3A-3B. Referring to FIG. 3A, one example of a format of a Prefetch Data (PFD) instruction 300, defined for the z/Architecture, is described. Prefetch Data instruction 300 includes, for instance, one or more opcode fields 302a, 302b that include an operation code specifying a prefetch data operation; a mask field ($M_1$) 304, also referred to as the first operand, that includes a code used to signal the CPU as to the intended use of the second operand (e.g., defined by $X_2$, $B_2$, $DL_2$ and $DH_2$ fields of the instruction, described further); an index field ($X_2$) 306; a base field ($B_2$) 308; and a plurality of displacement fields $DL_2$ 310 and $DH_2$ 312. The contents of the register designated by $X_2$ field 306 are added to the contents of the register designated by $B_2$ field 308, and the result is added to the displacement indicated by the $DL_2$ and $DH_2$ fields to provide the second operand, which is a logical address; however, if either the $X_2$ or $B_2$ fields contain zero, then the contents of the designated register is assumed to contain zeros.

Figure 3B:
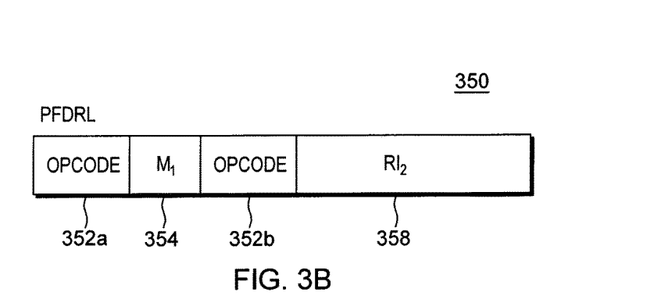
FIG. 3B depicts one example of a format of a Prefetch Data Relative Long instruction, in accordance with an aspect of the present invention.

As a further example, referring to FIG. 3B, a Prefetch Data Relative Long (PFDRL) instruction 350 includes, for instance, one or more opcode fields 352a, 352b that include an operation code specifying a prefetch data relative long operation; a mask field ($M_1$) 354, also referred to as the first operand, that includes a code used to signal the CPU as to the intended use of the second operand; and $RI_2$ 358 used to indicate a number of halfwords that are added to the address of the Prefetch Data Relative Long instruction to form the address of the second operand, as described below.

Subject to the controls specified in the $M_1$ field 304, 354, the CPU is signaled to perform one of the following operations: prefetch the second operand into a cache line; or release a cache line containing the second operand.

In particular, the $M_1$ field contains, e.g., a 4-bit unsigned binary integer that is used as a code to signal the CPU as to the intended use of the second operand. The codes are as follows, in one embodiment:

| Code | Function Performed |
|---|---|
| 1 | Prefetch the data at the second operand address into a cache line for fetch access. |
| 2 | Prefetch the data at the second operand address into a cache line for store access. |
| 6 | Release the cache line containing the second operand from the store access; retain the data in the cache line for fetch access. |
| 7 | Release the cache line containing the second operand from all accesses. |

All other codes are reserved, in this embodiment. Depending on the model, the CPU may not implement all of the prefetch functions. For functions that are not implemented by the CPU, and for reserved functions, the instruction acts as a no-op (no operation). Code 0 acts as a no-op, in one example.

No access exceptions or program event recording (PER) storage alteration events are recognized for the second operand, in this embodiment. Further, code 2 has no effect on the change bit for the second operand. For all codes, it is model dependent whether any translation lookaside buffer (TLB) entry is formed for the data that is prefetched. For Prefetch Data, the displacement is treated as a 20-bit signed binary integer, in this example.

For Prefetch Data Relative Long, the contents of the $RI_2$ field are a signed binary integer specifying the number of halfwords that is added to the address of the instruction to generate the address of the second operand. When dynamic address translation (DAT) is on, the second operand is accessed using the same addressing space mode as that used to access the instruction. When DAT is off, the second operand is accessed using a real address.

When Prefetch Data (Relative Long) is attempted in a nonconstrained transaction, and the code in the $M_1$ field is 6 or 7, the transaction may be aborted due to abort code 16. When Prefetch Data (Relative Long) is attempted in a constrained transaction, a transaction constraint program interruption is recognized, and the transaction is aborted with abort code 4.

The condition code remains unchanged, and in one example, the program exceptions include: operation (if the general instructions extension facility is not installed); and transaction constraint.

In the PFD and PFDRL instructions, particular codepoints may be used to distinguish between prefetches where the software knows the data will be used versus speculative prefetches where the data may not be used because the actual load/store is on a branch path and it is not known if that branch path will be taken. These codepoints may indicate the priority of the prefetch instruction, in one embodiment.

As a further example, a prefix type instruction, such as the Next Instruction Access Intent (NIAI) instruction defined in the z/Architecture, may be used to indicate the priority of the immediately following prefetch instruction. Other possibilities also exist.

As described herein, a prefetch queue is managed based on the priorities assigned to prefetch requests. In one example, low priority requests may be removed from the queue, when the queue is full, to enable the adding of higher priority requests. Further, the queue may also be managed based on cache bandwidth. Other metrics may also be used to manage the prefetch queue. Moreover, other examples of prefetch requests, including other instructions and/or other types of instructions, may be used. Assigning priorities to the prefetch requests and managing the prefetch queue based on the priorities may improve system performance.

Although the above is described in terms of a first level cache, e.g., L1 data cache, the same technique may be used in higher level caches. The prefetch request is passed to the higher level cache along with its priority. This higher level cache may also have a prefetch queue.

In addition to the above, one or more aspects of the present invention may be included and used in other types of computing environments. For instance, another example of a computing environment to incorporate and use one or more aspects of a prefetch request facility used to manage a prefetch queue is described with reference to FIG. 4A. In this example, a computing environment 400 includes, for instance, a native central processing unit (CPU) 402, a memory 404, and one or more input/output devices and/or interfaces 406 coupled to one another via, for example, one or more buses 408 and/or other connections. As examples, computing environment 400 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Figure 4A:
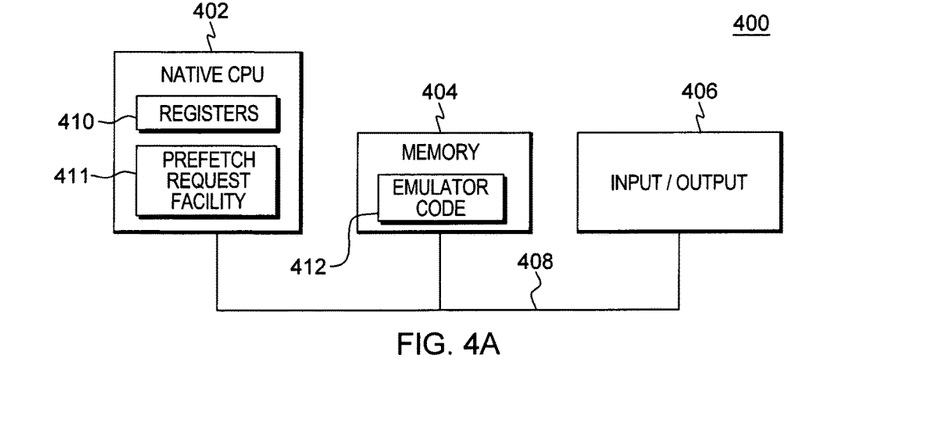
FIG. 4A depicts another example of a computing environment to incorporate and use one or more aspects of the present invention.

Native central processing unit 402 includes one or more native registers 410, such as one or more general purpose registers and/or one or more special purpose registers used during processing within the environment, as well as a prefetch request facility 411. These registers include information that represents the state of the environment at any particular point in time.

Moreover, native central processing unit 402 executes instructions and code that are stored in memory 404. In one particular example, the central processing unit executes emulator code 412 stored in memory 404. This code enables the computing environment configured in one architecture to emulate one or more other architectures. For instance, emulator code 412 allows machines based on architectures other than the z/Architecture, such as PowerPC processors, Power Systems servers, HP Superdome servers or others, to emulate the z/Architecture and to execute software and instructions developed based on the z/Architecture.

Figure 4B:
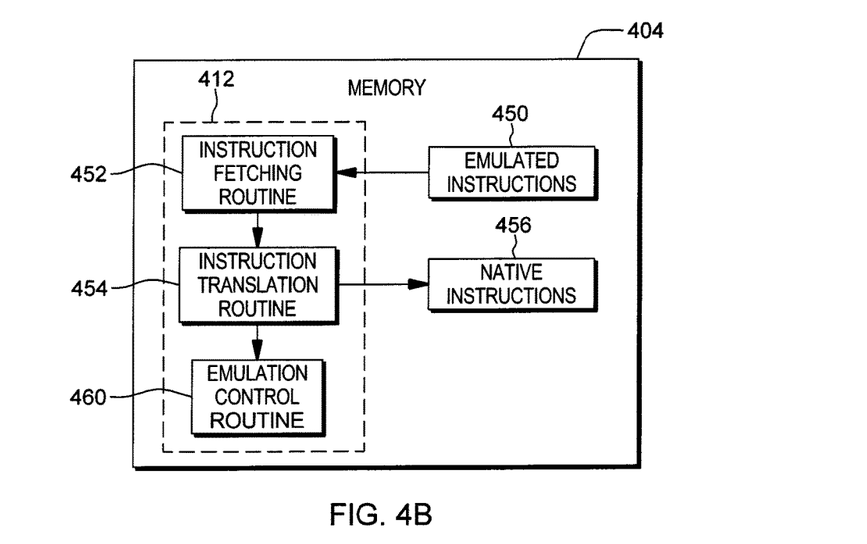
FIG. 4B depicts further details of the memory of FIG. 4A, in accordance with an aspect of the present invention.

Further details relating to emulator code 412 are described with reference to FIG. 4B. Emulated instructions 450 stored in memory 404 comprise software instructions (e.g., correlating to machine instructions) that were developed to be executed in an architecture other than that of native CPU 402. For example, emulated instructions 450 may have been designed to execute on a z/Architecture processor, but instead, are being emulated on native CPU 402, which may be, for example, an Intel Itanium II processor. In one example, emulator code 412 includes an instruction fetching routine 452 to obtain one or more emulated instructions 450 from memory 404, and to optionally provide local buffering for the instructions obtained. It also includes an instruction translation routine 454 to determine the type of emulated instruction that has been obtained and to translate the emulated instruction into one or more corresponding native instructions 456. This translation includes, for instance, identifying the function to be performed by the emulated instruction and choosing the native instruction(s) to perform that function.

Further, emulator code 412 includes an emulation control routine 460 to cause the native instructions to be executed. Emulation control routine 460 may cause native CPU 402 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 456 may include loading data into a register from memory 404; storing data back to memory from a register; or performing some type of arithmetic or logic operation, as determined by the translation routine.

Each routine is, for instance, implemented in software, which is stored in memory and executed by native central processing unit 402. In other examples, one or more of the routines or operations are implemented in firmware, hardware, software or some combination thereof. The registers of the emulated processor may be emulated using registers 410 of the native CPU or by using locations in memory 404. In embodiments, emulated instructions 450, native instructions 456 and emulator code 412 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing prefetch queues, said computer program product comprising:
a computer readable storage medium readable by a processing circuit and storing instructions for execution by the processing circuit for performing a method comprising:
obtaining a prefetch request based on executing a prefetch instruction included within a program and determining that data at a memory location designated by the prefetch instruction is not located in a selected cache, the prefetch request having a priority assigned thereto, the priority indicating confidence by the program in whether the prefetch request will be used;
determining, based on obtaining the prefetch request, whether the prefetch request may be placed on a prefetch queue, the determining comprising:
determining whether the prefetch queue is full;
checking, based on determining the prefetch queue is full, whether the priority of the prefetch request is considered a high priority;
determining, based on the checking indicating the priority of the prefetch request is considered a high priority, whether another prefetch request on the prefetch queue may be removed;
removing the other prefetch request from the prefetch queue, based on determining the other prefetch request may be removed; and
adding the prefetch request to the prefetch queue, based on removing the other prefetch request.

2. The computer program product of claim 1, wherein the other prefetch request is assigned a priority that is considered a low priority.

3. The computer program product of claim 1, wherein the priority is selected from more than two possible priorities.

4. The computer program product of claim 1, wherein the method further comprises discarding the prefetch request, based on the checking indicating the priority of the prefetch request is not considered a high priority.

5. The computer program product of claim 1, wherein the method further comprises determining how to process the prefetch request, based on determining another prefetch request may not be removed.

6. The computer program product of claim 5, wherein the determining how to process the prefetch request includes choosing to defer processing of the prefetch request for a defined time.

7. The computer program product of claim 1, wherein the method further comprises:
determining, based on the prefetch queue not being full, whether the prefetch queue is nearly full in that it can accept a predefined number of additional requests or there is a low cache bandwidth in that an arrival rate of cache requests has a predefined relationship with respect to a number of bytes per a select number of cycles;
checking, based on determining the prefetch queue is nearly full or there is a low cache bandwidth, whether the priority of the prefetch request is considered a high priority; and
adding the prefetch request to the prefetch queue based on determining the prefetch queue is nearly full or there is a low cache bandwidth and the priority of the prefetch request is considered a high priority.

8. The computer program product of claim 7, wherein the method further comprises discarding the prefetch request, based on determining the prefetch queue is nearly full or there is a low cache bandwidth and the priority of the prefetch request is not considered a high priority.

9. The computer program product of claim 7, wherein the method further comprises adding the prefetch request to the prefetch queue, based on determining the prefetch queue is not nearly full or there is not a low cache bandwidth.

10. The computer program product of claim 1, wherein the method further comprises:
   determining, based on the prefetch queue not being full, whether there is a low cache bandwidth in that an arrival rate of cache requests has a predefined relationship with respect to a number of bytes per a select number of cycles;
   checking, based on determining there is a low cache bandwidth, whether the priority of the prefetch request is considered a high priority; and
   adding the prefetch request to the prefetch queue based on determining there is a low cache bandwidth and the priority of the prefetch request is considered a high priority.

11. The computer program product of claim 1, wherein the selected cache is a level 1 cache.

12. A computer system for managing prefetch queues, said computer system comprising:
   a memory; and
   a processor in communication with the memory, wherein the computer system is configured to perform a method, said method comprising:
      obtaining a prefetch request based on executing a prefetch instruction included within a program and determining that data at a memory location designated by the prefetch instruction is not located in a selected cache, the prefetch request having a priority assigned thereto, the priority indicating confidence by the program in whether the prefetch request will be used;
      determining, based on obtaining the prefetch request, whether the prefetch request may be placed on a prefetch queue, the determining comprising:
      determining whether the prefetch queue is full;
      checking, based on determining the prefetch queue is full, whether the priority of the prefetch request is considered a high priority;
      determining, based on the checking indicating the priority of the prefetch request is considered a high priority, whether another prefetch request on the prefetch queue may be removed;
      removing the other prefetch request from the prefetch queue, based on determining the other prefetch request may be removed; and
      adding the prefetch request to the prefetch queue, based on removing the other prefetch request.

13. The computer system of claim 11, wherein the method further comprises:
   determining, based on the prefetch queue not being full, whether the prefetch queue is nearly full in that it can accept a predefined number of additional requests or there is a low cache bandwidth in that an arrival rate of cache requests has a predefined relationship with respect to a number of bytes per a select number of cycles;
   checking, based on determining the prefetch queue is nearly full or there is a low cache bandwidth, whether the priority of the prefetch request is considered a high priority; and
   adding the prefetch request to the prefetch queue based on determining the prefetch queue is nearly full or there is a low cache bandwidth and the priority of the prefetch request is considered a high priority.

14. The computer system of claim 13, wherein the method further comprises discarding the prefetch request, based on determining the prefetch queue is nearly full or there is a low cache bandwidth and the priority of the prefetch request is not considered a high priority.

15. The computer system of claim 13, wherein the method further comprises adding the prefetch request to the prefetch queue, based on determining the prefetch queue is not nearly full or there is not a low cache bandwidth.

16. A computer-implemented method of managing prefetch queues, said computer-implemented method comprising:
   obtaining, by a processor, a prefetch request based on executing a prefetch instruction included within a program and determining that data at a memory location designated by the prefetch instruction is not located in a selected cache, the prefetch request having a priority assigned thereto, the priority indicating confidence by the program in whether the prefetch request will be used;
   determining, based on obtaining the prefetch request, whether the prefetch request may be placed on a prefetch queue, the determining comprising:
   determining whether the prefetch queue is full;
   checking, based on determining the prefetch queue is full, whether the priority of the prefetch request is considered a high priority;
   determining, based on the checking indicating the priority of the prefetch request is considered a high priority, whether another prefetch request on the prefetch queue may be removed;
   removing the other prefetch request from the prefetch queue, based on determining the other prefetch request may be removed; and
   adding the prefetch request to the prefetch queue, based on removing the other prefetch request.

17. The computer-implemented method of claim 16, wherein the other prefetch request is assigned a priority that is considered a low priority.

18. The computer-implemented method of claim 16, further comprising:
   determining, based on the prefetch queue not being full, whether the prefetch queue is nearly full in that it can accept a predefined number of additional requests or there is a low cache bandwidth in that an arrival rate of cache requests has a predefined relationship with respect to a number of bytes per a select number of cycles;
   checking, based on determining the prefetch queue is nearly full or there is a low cache bandwidth, whether the priority of the prefetch request is considered a high priority; and
   adding the prefetch request to the prefetch queue based on determining the prefetch queue is nearly full or there is a low cache bandwidth and the priority of the prefetch request is considered a high priority.

19. The computer-implemented method of claim 18, further comprising discarding the prefetch request, based on determining the prefetch queue is nearly full or there is a low cache bandwidth and the priority of the prefetch request is not considered a high priority.

20. The computer-implemented method of claim 18, further comprising adding the prefetch request to the prefetch queue, based on determining the prefetch queue is not nearly full or there is not a low cache bandwidth.

\* \* \* \* \*